United States Patent [19]
Gobert et al.

[11] 3,928,506
[45] Dec. 23, 1975

[54] LYSINO-CALCIUM CHLORIDE AND PHARMACEUTICALLY ACCEPTABLE ACID SALTS THEREOF

[75] Inventors: Jean, Georges Gobert, Brussels; Jean, Adolphe Close, Linkebeek, both of Belgium

[73] Assignee: UCB Societe Anonyme, Brussels, Belgium

[22] Filed: Dec. 28, 1973

[21] Appl. No.: 429,297

[30] Foreign Application Priority Data
Jan. 2, 1973 United Kingdom.................. 192/73

[52] U.S. Cl. ....... 260/924; 260/295 S; 260/295.5 S; 260/479 R; 260/501.11; 260/501.12; 260/534 L; 424/199; 424/246; 424/311; 424/316
[51] Int. Cl.² .................. C07C 101/26; C07F 9/08
[58] Field of Search ...... 260/534 L, 501.11, 501.12, 260/295 S, 295.5 S, 479 R, 924

[56] References Cited
UNITED STATES PATENTS

| | | | |
|---|---|---|---|
| 2,386,273 | 10/1945 | Shonle et al. ................ | 260/501.1 X |
| 2,833,821 | 5/1958 | Hause ............................. | 260/534 L |
| 3,010,972 | 11/1961 | Kaiser et al. ................ | 260/501.11 X |
| 3,355,488 | 11/1967 | Restivo et al. .................... | 260/534 S |

FOREIGN PATENTS OR APPLICATIONS

| | | | |
|---|---|---|---|
| 42-23330 | 11/1967 | Japan .................................. | 260/924 |
| 43-3169 | 5/1968 | Japan .................................. | 260/924 |

*Primary Examiner*—Richard L. Raymond
*Attorney, Agent, or Firm*—Wenderoth, Lind & Ponack

[57] ABSTRACT

Lysino-calcium chloride of the formula

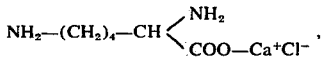

its optically acceptable isomers, their pharmaceutically active acid addition salts, processes for the preparation thereof, pharmaceutical compositions containing them and the therapeutic use thereof for the treatment of calcium deficiency.

24 Claims, No Drawings

LYSINO-CALCIUM CHLORIDE AND PHARMACEUTICALLY ACCEPTABLE ACID SALTS THEREOF

The present invention is concerned with a new compound, lysino-calcium chloride, with its salts with pharmaceutically acceptable acids, with a pharmaceutical composition containing them and also with the preparation of these compounds and the therapeutic use thereof for the treatment of calcium deficiency.

It is known that calcium is the most abundant and the most important of the four metals calcium, potassium, sodium and magnesium essential for the maintenance of functional equilibrium of the human system; it accounts, in fact, for from 1100 to 1500 grams of the weight of an adult human body, i.e., from 1.6% to 2.2% of all the 11 constituent elements which represent about 98% of the elementary analysis of the human body.

As the result of different factors, including osseous acceleration and excretion, the calcium balance is naturally negative in the individual and must be balanced by a constant nutritional supply. By way of example, the human nutritional requirements of calcium have been estimated at the following values:

| | |
|---|---|
| child up to 1 year | 400–600 mg. per day |
| child from 1 to 18 years of age | 700–1900 mg. per day |
| adult | 800 mg. per day |
| during pregnancy or lactation | 1200–1300 mg. per day |

This shows that, in the event of a calcium deficiency, whether or not of pathological origin, it is advisable to supply calcium in order to restore balanced mineralisation.

In order that calcium medication may be effective, it is obviously necessary for the calcium to be presented in a form which can be resorbed by the system.

Certain factors, for example the presence of anions leading to the formation of sparingly soluble calcium salts, the increase of pH, or the presence of certain metallic ions, such as magnesium or the like, reduce the resorption of calcium, whereas other factors promote the resorption of calcium, particularly glucides (lactose and the like), proteins and amino-acids. With regard to the amino-acids, it has been observed that lysine and arginine are the two amino-acids having the greatest efficiency as resorption auxiliaries (Lehman et al., J. Physiology, 100, (1941–1942), 17–18P; Wasserman et al., J. Nutrition, 59, (1956), 371–383). Of these two amino-acids, lysine is the most important because, apart from its properties of activating the calcium metabolism, it is an amino-acid which, in its laevorotatory form, is essential to man. Minimum daily requirements of L-lysine (in the presence of other essential amino-acids) have been established as follows:

| | |
|---|---|
| adult male (70 kg.) | 0.8 g. |
| old people | 0.6 to 0.9 g. |
| adolescent | 0.23 g./kg. body weight |
| child | 0.17 g./kg. body weight |

It will, therefore, be appreciated that, in certain cases, an addition of L-lysine is justified on the same grounds as an addition of calcium.

For this reason, it has already been proposed to associate lysine with calcium for therapeutic and dietetic applications. French special medical Patent No. 648 M discloses a medicinal composition which contains lysine ascorbate, calcium ascorbate and water. Nevertheless, it should be noted that the percentage of calcium in this composition is relatively low, namely 5.1% calcium. Furthermore, the effectiveness of this composition has not been proved by pharmacological and/or clinical results.

U.S. patent specification No. 2,833,821 describes the preparation of calcium lysinate, using, as starting materials, basic lysine in aqueous solution and calcium hydroxide. This compound is said to be useful as a stabilizer for acetylsalicylic acid and for the simultaneous dietetic supply of calcium and lysine. Nevertheless, this last-mentioned use has not been proved by pharmacological and/or clinical tests; this fact is all the more regrettable because calcium lysinate as such cannot be used directly as a medicine because of its excessively high basicity. It is also to be noted that calcium lysinate contains two molecules of lysine per atom of calcium so that the theoretical calcium content in calcium lysinate is only 12.1% by weight. If calcium lysinate is neutralized with citric acid in order to enable it to be administered, its calcium content then falls to 5.23% by weight. Finally, from the point of view of economy of the process, the use of the basic L-lysine as starting material is disadvantageous because of its high cost.

According to the present invention, there is provided a new compound of calcium and lysine, namely lysino-calcium chloride, which, in the form of salts of pharmaceutically acceptable acids, is outstandingly suitable for the treatment of calcium deficiency.

In order to prepare lysino-calcium chloride, according to the present invention, lysine monohydrochloride is reacted in an aqueous, anhydrous alcoholic or aqueous alcoholic medium with calcium hydroxide or calcium oxide.

The lysine monohydrochloride is preferably used in the biologically active laevorotatory form; however, the dextrorotatory form or a mixture of the L and D forms may also be used.

When the lysino-calcium chloride is prepared in an aqueous medium, the lysine monohydrochloride is dissolved in water and an at least equimolar amount of calcium oxide or calcium hydroxide is added. In order to take account of the possible carbonation of the calcium oxide and/or hydroxide in the course of the reaction, it is advantageous, on the one hand, to add a slight excess of base in relation to the hydrochloride, namely 1.01 to 1.20 moles of base per mole of hydrochloride, and, on the other hand, to carry out the reaction in an inert gas atmosphere, for example in an atmosphere of nitrogen. After completion of the reaction, excess solid calcium base or precipitated calcium carbonate formed during the reaction is filtered off, if necessary. The aqueous solution of lysino-calcium chloride thus obtained may be used directly for the preparation of lysino-calcium chloride salts with pharmaceutically acceptable acids. It is, however, also possible to isolate the lysino-calcium chloride by evaporation in vacuo to dryness of the aqueous reaction solution or by lyophilization of this aqueous solution.

When lysino-calcium chloride is prepared in an anhydrous or aqueous alcoholic medium, the reaction is initially carried out in suspension in view of the fact that both lysine hydrochloride and the calcium base are insoluble in alcohols. The lysino-calcium chloride dissolves as it is formed. As in the case of carrying out the reaction in an aqueous medium, as described above, it is here also preferred to use from 1.01 to 1.20 moles of calcium base per mole of hydrochloride, the reaction again preferably being carried out in an inert gas atmosphere. At the end of the reaction, the alcoholic or aqueous alcoholic solution is filtered to remove any excess of base and/or any calcium carbonate formed. The clear alcoholic or aqueous alcoholic solution of lysino-calcium chloride thus obtained may be used directly for the preparation of salts with pharmaceutically acceptable acids or the lysino-calcium chloride may be isolated therefrom by evaporation to dryness or by precipitation with a non-solvent for lysino-calcium chloride, for example heptane. The alcohol, in the presence of which the reaction is carried out between lysine hydrochloride and calcium hydroxide and/or calcium oxide according to the present invention may be a saturated aliphatic alcohol containing up to 5 carbon atoms or an araliphatic alcohol, for example benzyl alcohol. For obvious economic reasons, it is preferred to use alcohols in which lysino-calcium chloride has the greatest possible solubility; this is the case with ethanol and, in particular, methanol.

Whether the medium is aqueous, alcoholic or aqueous alcoholic, the reaction between lysine hydrochloride and calcium oxide and/or calcium hydroxide may be carried out at ambient temperature. Nevertheless, the reaction may be accelerated by heating to the reflux temperature of the reaction medium. In both cases, it is advantageous to operate in an inert gas atmosphere, for example in an atmosphere of nitrogen.

Lysino-calcium chloride, which is very soluble in water, is a white, amorphous powder, the elementary analysis of which corresponds to the empirical formula:
   $(C_6H_{13}N_2O_2ClCa) \cdot H_2O$ i.e. a compound containing 1 molecule of lysine, 1 molecule of calcium, 1 atom of chlorine and 1 molecule of water.

Analysis:
| | C 6 | H 15 | N 2 | O 3 | Cl 1 | Ca 1 |
|---|---|---|---|---|---|---|
| Calculated | | | | | | |
| Found | 6.25 | 15.93 | 1.98 | 2.92 | 0.945 | 0.985 |

Three reaction equations may be proposed on the basis of a general reaction equation:

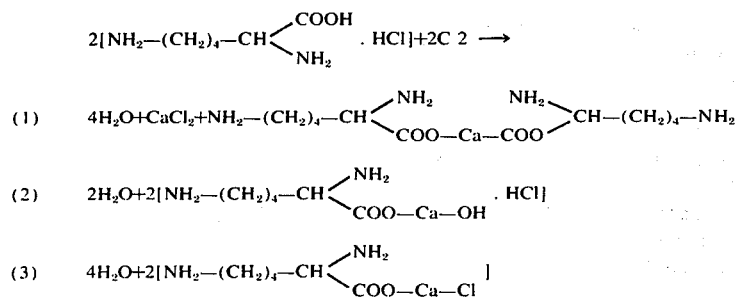

No other equation would respect the criteria of the elementary and functional analyses corresponding to 1-1-1 stoichiometry (lysine-Ca-Cl).

Equation (1) must be rejected because, under the conditions of preparation by precipitation of lysino-calcium chloride with heptane, the calcium chloride would remain soluble in the mixture. The precipitate would, therefore, contain no chlorine, which is incompatible with the analytical results. Furthermore, it was possible, by paper chromatography (ascending on Whatman No. 1 paper with n-butanol-ethanol (1/1) as eluent), to prove the absence of calcium chloride in the alcoholic reaction medium (development: autoradiography of $^{45}Ca$ or coloration of $Ca^{++}$ by alizarin in methanol and of lysine by ninhydrin).

Equation (2) must also be rejected; electrotitration reveals, in fact, two titratable amino groups and examination of the infra-red spectra excludes any possibility corresponding to the formation of these reaction products. The infra-red spectrum of the substance obtained according to the present invention is qualitatively similar to the spectrum obtained with calcium lysinate. The disappearance of the $NH_3^+$ bands of lysine hydrochloride (1505 cm$^{-1}$ or 6.67$\mu$, mean intensity, and 2115 cm$^{-1}$ or 4.74$\mu$, low intensity) shows that the two amino groups of the substance obtained are not ionized, thus excluding the possibility of an amine hydrochloride.

Equation (3), is, therefore, the only one which can be accepted so that the product obtained corresponds to the formula:

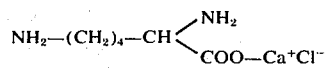

which is thus given the name lysino-calcium chloride.

In view of the fact that the $Ca^+Cl^-$ bond cannot be detected by infra-red spectrography, the spectra of calcium lysinate[$(Lys)_2Ca$] and of lysino-calcium chloride (Lys—Ca—Cl) are, therefore, qualitatively similar. Nevertheless, the following characteristic values differentiate the two substances:

a. the ratio of molar extinction coefficients (expressed in Ca)

$$\frac{\epsilon \text{ Lys-Ca-Cl}}{\epsilon \text{ (Lys)}_2\text{Ca}} = 0.508 \text{ at } 1565 \text{ cm}^{-1} \text{ (C=O)}$$

$$\frac{\epsilon \text{ Lys-Ca-Cl}}{\epsilon \text{ (Lys)}_2\text{Ca}} = 0.465 \text{ at } 2935 \text{ cm}^{-1} \text{ (C—H)}$$

which proves the existence of twice as much COO$^-$ and twice as much CH in the case of $(Lys)_2Ca$ as compared with Lys—Ca—Cl;

b. the optical rotation $[\alpha]_D^{20°}$ $^C$ of + 3.42° for Lys—Ca—Cl and of + 13.33° for $(Lys)_2Ca$;

c. the viscosity $\eta^{25°}$ $^C$ of 3.98 centipoises for Lys—Ca—Cl and 7.00 centipoises for $(Lys)_2Ca$;

d. the density $\rho^{25°}$ $^C$ of 1.040 for Lys—Ca—Cl and 1.037 for $(Lys)_2Ca$, the values (b), (c) and (d) being measured in molar aqueous solution.

It will be noted that calcium lysinate $(Lys)_2Ca$ contains twice as much lysine (Lys) as the lysino-calcium chloride (Lys—Ca—Cl) according to the present invention but that, on the other hand, the calcium content of the latter is much higher (18.1% for lysino-calcium chloride and 12.1% for calcium lysinate). The compound according to the present invention is, therefore, more advantageous for the treatment of calcium deficiency.

Nevertheless, lysino-calcium chloride is a base (pH of the 1 mole solution = 11.2) which must, therefore, be salified with pharmaceutically acceptable acids for therapeutic administration. The pharmaceutically acceptable acids used for this purpose are inorganic acids, for example hydrochloric, hydrobromic, sulfuric, phosphoric, carbonic and the like acids; organic carboxylic acids, for example acetic, propionic, pivalic, glycolic, lactic, malonic, succinic, maleic, hydroxymaleic, malic, tartaric, citric, aminoacetic, gluconic, glutamic, benzoic, salicylic, 2-acetoxybenzoic, nicotinic, isonicotinic and the like acids; and organic sulfonic acids, for example methane-sulfonic, ethane-sulfonic, ethane-1,2-disulfonic, 2-hydroxy-ethane-sulfonic, p-toluene-sulfonic and the like acids.

The salts of lysino-calcium chloride can be prepared by three methods.

In the first method, an aqueous solution of the acid is added, in a stoichiometric ratio, to an aqueous solution of lysino-calcium chloride. The reaction mixture is then evaporated in vacuo or lyophilized. This method has been used, for example, for the preparation of lysino-calcium chloride glutamate (percentage of calcium found: 10.9), lysino-calcium chloride glycinate (percentage of calcium found: 13.5), lysino-calcium chloride α-glycero-phosphate (percentage of calcium found: 10.2) and of lysino-calcium chloride gluconate (percentage of calcium found: 9.6).

In the second method, an alcoholic solution of the acid is added to an alcoholic solution of lysino-calcium chloride. The salt formed in this manner precipitates from the alcohol and is recovered by filtration. This method is used, for example, to prepare lysino-calcium chloride monoacetate (percentage of calcium found: 13.2), lysino-calcium chloride citrate (2/1) (percentage of calcium found: 11.7) and lysino-calcium chloride monophosphate (percentage of calcium found: 11.5) and the like.

Since lysine contains two amino groups, depending upon the molar ratio selected, it will be possible to prepare salts which still contain a positive charge, for example the three salts mentioned above, or which no longer contain a positive charge, for example lysino-calcium chloride diacetate (percentage of calcium found: 11.75) and lysino-calcium chloride citrate (1/1) (percentage of calcium found: 9.6).

The third method is that used for the preparation of lysino-calcium carbonate or bicarbonate. This consists of bubbling carbon dioxide into an alcoholic solution of lysino-calcium chloride. Depending upon whether the solution contains less than 0.8 mole per liter of lysino-calcium chloride, preferably 0.2 to 0.6 mole, or more than 0.8 mole per liter of lysino-calcium chloride, preferably about 1 mole, there is obtained, respectively, lysino-calcium chloride bicarbonate or carbonate, which are separated by filtration.

The following Examples are given for the purpose of illustrating the present invention:

EXAMPLE 1.

Preparation of lysino-calcium chloride in an aqueous medium.

1 mole (182.7 g.) L-lysine monohydrochloride is dissolved in 1 liter water in a 1.5 liter flask at ambient temperature.

While preventing the entry of atmospheric carbon dioxide by bubbling in nitrogen, 1 mole (56.08 g.) solid calcium oxide or 1 mole (74.09 g.) solid calcium hydroxide is added and the reaction mixture is stirred. The reaction is completed within a few minutes at ambient temperature. The solution is filtered if any precipitate is present.

In order to obtain solid lysino-calcium chloride, the reaction mixture is either evaporated to dryness or lyophilized. However, for the preparation of salts of lysino-calcium chloride with acids, the reaction mixture can be used directly.

EXAMPLE 2.

Preparataion of lysino-calcium chloride in an alcoholic medium.

The reaction is carried out in a three-necked 1.5 liter flask provided with a mechanical stirrer, a condenser and a system for bubbling in nitrogen. 700 ml. denatured ethanol (an azeotropic mixture of 95% ethanol and 5% diethyl ether) are poured into the flask and 1 mole (182.7 g.) L-lysine monohydrochloride is added. 1.2 mole (67.28 g.) calcium oxide is added gradually, while slowly stirring (20 r.p.m.) and while heating the mixture under reflux. After about 1 hour, the reaction is completed. Excess calcium base is removed by decantation and the alcoholic solution of L-lysino-calcium chloride obtained is filtered through a Buchner funnel containing filter paper on a sintered glass plate (G3) covered with "Hyflocel" (diatomaceous earth). The lysino-calcium chloride is isolated from the filtered alcoholic solutin by evaporation in vacuo or by precipitation with 2 volumes of heptane or benzene per volume of alcoholic solution obtained. The yield of lysino-calcium chloride is 98% of theory. However, as in Example 1, the alcoholic solution of lysino-calcium chloride may be used directly for the subsequent preparation of salts of this compound with acids.

The same result as that indicated above is obtained by making the following modifications:
  the use of 1.10 moles calcium oxide (61.68 g.);
  the use of 1.0 mole calcium oxide (56.08 g.);
  the use of 1.0 mole calcium hydroxide (74.09 g.);
  replacement of denatured ethanol by the same volume of the absolute ethanol;
  replacement of denatured ethanol by the same volume of absolute methanol; after 45 minutes, the yield of lysino-calcium chloride obtained is 96% of theory;
  replacement of the 700 ml. denatured ethanol by 4 liters n-butanol; after heating for 4 hours under reflux, the yield obtained is 30% of theory;
  replacement of denatured ethanol by a 50/50 mixture of denatured ethanol and methanol. After 45 minutes, the yield of lysino-calcium chloride is 95% of theory;
  replacement of the 700 ml. denatured ethanol by 1 liter benzyl alcohol. After heating for 3 hours under reflux, the yield of lysino-calcium chloride is 90% of theory.

inversion of the order of addition of the reactants.

EXAMPLE 3.

Preparation of salts of L-lysino-calcium chloride in an aqueous medium.

1 liter of a 1 molar aqueous solution of L-lysino-calcium chloride (220 g.) is mixed, while stirring, with 1 liter of a 1 molar aqueous solution of citric acid (192 g.) at ambient temperature. A clear solution is thus obtained, which is lyophilized or evaporated in vacuo to isolate L-lysino-calcium chloride citrate (1/1). The yield is practically quantitative.

When the 1 molar solution of citric acid is replaced by a 0.5 mole solution of the same acid (containing 96 g. citric acid), L-lysino-calcium chloride citrate (2/1) is obtained.

Operating in the same way, L-lysino-calcium chloride L-glutamate (1/1) is obtained by replacing the citric acid solution by 1 liter of a 1 molar aqueous solution (147.1 g.) of L-glutamic acid.

EXAMPLE 4.

Preparation of L-lysino-calcium chloride salts in an alcoholic medium.

1 liter of a 1 molar ethanolic solution of L-lysino-calcium chloride (220 g.) and 1 liter of a fresh 1 molar ethanolic solution of citric acid (192 g.) are introduced into a 3 liter flask containing 100 ml. ethanol, while vigorously stirring, these two solutions being introduced simultaneously at the rate of 50 ml. each per minute. A transparent gel is formed which is stirred with increasing vigour as the gel thickens. At the end of the reaction, the resulting paste is filtered in vacuo. The filter cake is freed from residual solvent by drying in vacuo or by lyophilization. The yield is 99–100% of L-lysino-calcium chloride citrate (1/1).

The filter cake can also be freed from the filtrate by one of the following methods: evaporation of the mixture in vacuo with moderate heating (30°–35°C.); evaporation of the mixture in a ventilation chamber at ambient temperature; or elimination of the residual alcohol by the addition of 1 volume of diethyl ether or 1 volume of diisopropyl ether per volume of alcohol about 16 hours after paste formation.

In order to prepare L-lysino-calcium chloride citrate (2/1), the 1 molar solution of citric acid used above is replaced by a 0.5 molar solution of citric acid (96 g.). The same citrate can also be obtained when the lysino-calcium chloride solution is 1.1 molar (231 g.) and the citric acid solution 0.5 molar (96 g.).

In the method of this Example, it is also possible to replace the ethanol by the same volume of a 50—50 mixture of ethanol-methanol or by the same volume of methanol.

EXAMPLE 5.

In the method described in Example 4, the ethanolic solution of citric acid is replaced by 1 liter of a 2.4 molar ethanolic solution of acetic acid (144 g.). After washing the resulting filter cake with three 250 ml. portions of ethanol and then drying in vacuo, there is obtained L-lysino-calcium chloride diacetate. Yield: 90% of theory.

Analysis:
calculated:   Ca 11.78%   N 8.25%   Cl 10.42%

-continued

Analysis:
found:   11.75%   7.97%   10.50%

When, in this Example, the 2.4 molar solution of acetic acid is replaced by a 1 molar solution (60 g.) of acetic acid, L-lysino-calcium chloride monoacetate is obtained after filtration and drying.

EXAMPLE 6.

Gaseous carbon dioxide is bubbled at ambient temperature into a 1 molar ethanolic solution of L-lysino-calcium chloride. After bubbling in the gas for one hour, no further insoluble material is formed by introducing carbon dioxide. The precipitate is filtered off and washed with a minimum of ethanol (100 ml. per liter of starting materials). After drying in vacuo, the analysis of the product obtained shows that it is L-lysino-calcium chloride carbonate.

When, in the above method, the 1 molar solution is replaced by a 0.2 molar (44 g.) or 0.6 molar (132 g.) solution of L-lysino-calcium chloride, the precipitate thus obtained is L-lysino-calcium chloride bicarbonate.

A. Physiological tests.

In order to determine the efficacy of the compounds according to the present invention, various biological parameters of activity in the rat were measured, namely:

the incorporation into the femurs of freshly administered calcium,
the incorporation into the incisors of freshly administered calcium.

A therapeutically effective calcium derivative must permit optimum resorption. After the administration of various compounds, the calcium of which was marked by the use of $^{45}Ca$, this resorption is measured by evaluation of the calcium $^{45}Ca$ excreted in the faeces. The smaller is the amount excreted in 48 hours, the better is the resorption of calcium.

The most significant measure of the usefulness of a calcification product is the direct measurement of the amount of $^{45}Ca$ incorporated in the bone (femur and incisors) 32 hours after oral administration. The greater is this amount, the higher is the value of the compounds tested as calcification agents.

The calcium derivatives were administered orally in the form of an aqueous solution (by means of an oesophagal probe), utilizing for each test five animals, each weighing 120 g., the dose of calcium administered corresponding to 20 mg. elementary calcium in each of the calcium compounds used.

In order to understand more fully the therapeutic usefulness of the calcium compounds according to the present invention, control compounds were also used in the tests described above, these being compounds traditionally used for the treatment of calcium deficiency.

The results of these tests are summarized in the following Table:

TABLE 1

| Compounds administered | Dose in % incorporated into 2 femurs | Dose in % incorporated into 2 incisors |
|---|---|---|
| Controls | | |
| Calcium chloride | 3.5 | 0.95 |
| Calcium gluconate | 3.45 | 1.0 |

TABLE I-continued

| Compounds administered | Dose in % incorporated into 2 femurs | Dose in % incorporated into 2 incisors |
|---|---|---|
| Calcium lactobionate | 2.2 | 0.6 |
| Calcium phosphate | 1.2 | 0.3 |
| Calcium glycerophosphate | 1.2 | 0.3 |
| Compounds according to the invention | | |
| L-lysino-calcium chloride glycinate (1/1) | 4.6 | — |
| L-lysino-calcium chloride glutamate (1/1) | 4.4 | 1.2 |
| L-lysino-calcium chloride citrate (1/1) | 4.45 | 1.3 |
| L-lysino-calcium chloride monoacetate | 3.8 | — |
| L-lysino-calcium chloride hydrochloride (1/1) | 3.5 | 1 |
| L-lysino-calcium chloride carbonate (2/1) | 3.1 | — |
| L-lysino-calcium chloride bicarbonate (1/1) | 3.2 | 0.8 | are administered to a group of 5 patients of both sexes according to the "cross-over" method (i.e. each patient receives both substances marked with $^{45}$Ca in a haphazard order, with 4 days intervals between the two successive administrations). The criterion of passing the intestinal barrier is the rate of calcium in the blood, which is determined by recording the blood radioactivity (number of knocks per minute) during a period of 0 to 4 hours, namely after 5 minutes, 1 hour, 2 hours, 3 hours and 4 hours. The mean radioactivity of these 5 records is calculated and given in Table II below.

In a second series of tests, a dose of 250 mg calcium (instead of the 500 mg of calcium in the first series) is again administered to a group of 5 patients of both sexes. Radioactivity is recorded as in the first series but after 1 hour, 2 hours, 3 hours, 4 hours and 8 hours and leaving intervals of 3 days between the two successive administrations. The mean radioactivity (mean number of knocks per minute of the 5 records) is calculated and given in Table III below.

TABLE II

| Patient | Sex* | Age | (dose of 500 mg. $^{45}$Ca) Citrolysinate (A) | Lactobionate (B) | A/B ratio |
|---|---|---|---|---|---|
| 1 | M | 25 | 91 | 79 | 1.15 |
| 2 | M | 26 | 100 | 85 | 1.17 |
| 3 | F | 52 | 165 | 147 | 1.12 |
| 4 | M | 56 | 133 | 121 | 1.09 |
| 5 | M | 26 | 96 | 85 | 1.13 |
| Means | | 37 | 117 | 103 | 1.13 |

TABLE III

| Patient | Sex* | Age | (dose of 250 mg. $^{45}$Ca) Citrolysinate (A) | Lactobionate (B) | A/B ratio |
|---|---|---|---|---|---|
| 1 | F | 78 | 331 | 111 | 2.98 |
| 2 | F | 72 | 160 | 145 | 1.11 |
| 3 | M | 64 | 96 | 73 | 1.32 |
| 4 | F | 43 | 243 | 126 | 1.93 |
| 5 | M | 43 | 169 | 105 | 1.61 |
| Means | | 60 | 200 | 112 | 1.80 |

*M = masculin patient
F = feminin patient

B. Toxicity.

Measurement of acute toxicity in male mice (NMRI strain) and male Wistar rats shows that the compounds of the present invention are practically free from toxicity. Thus, in the case of lysino-calcium chloride citrate (1/1), the following results were obtained:

in the case of intravenous administration, the $LD_{50}$ is:
  higher than 600 mg./kg. for the mice
  higher than 420 mg./kg. for rats
in the case of oral administration, the $LD_{50}$ is:
  higher than 10 g./kg. for mice
  higher than 8 g./kg. for rats.

C. Clinical tests.

The clinical tests too have shown the advantageous behavior of the compounds according to the invention as compared with those of the known calcium medications.

In the test of intestinal absorption of medications, a compound according to the invention, namely L-lysino-calcium chloride citrate (1/1) (abbreviated as calcium citrolysinate), prepared as in Example 3 above, is compared with calcium lactobionate representing the known art, both compounds being marked with radioactive $^{45}$Ca.

In a first series of tests, a dose of 500 mg calcium in the form of calcium citrolysinate (A) and an equivalent dose of calcium in the form of calcium lactobionate (B)

These Tables clearly show that the mean rates of calcium in the blood obtained with calcium citrolysinate are 13% and 80% higher than those obtained with calcium lactobionate.

In another experiment, carried out on 11 healthy patients receiving calcium citrolysinate (A) and the reference product (C) described below, both being marked with $^{47}$Ca, an anthropogammameter is used as the measuring apparatus. This apparatus measures the intensity of the gamma rays emitted by the whole body of the patient due to administration of $^{47}$Ca. It has thus been established that calcium citrolysinate is fixed in the bones proportionally to the blood serum rates and that it is more regularly absorbed by the intestin than the reference product (C), since the divergences of the individual records from the mean value are less for calcium citrolysinate than for the reference product (C), both in the case of blood serum rates and in that of the retention in the pelvis after 7 days.

The product (C) used as reference has the following formulation:

calcium glycerophosphate ($^{17}$Ca)   201 mg.
  calcium hydroxide ($^{47}$Ca)   392 mg.
  ascorbic acid   233 mg.
  (i.e. a total of 250 mg. elementary $Ca^{++}$)

The same conclusions are drawn when calcium lactobionate (B) is used instead of the reference product (C) hereinabove.

The new compounds of the present invention are used in calcium therapy in the form of pharmaceutical compositions containing these compounds in admixture with a solid or liquid, organic or inorganic pharmaceutical diluent or carrier which is suitable for oral or parenteral administration. This diluent or carrier can be, for example, in particular water, gelatine, lactose, starch, magnesium stearate, talc, sodium bicarbonate, citric acid, polyvinylpyrrolidone, sodium benzoate or the like or other excipients currently used for this purpose. Other therapeutically valuable substances, for example vitamins, may also be added. The pharmaceutical compositions obtained in this manner can be in the form of tablets, cachets, sugar-coated pills, capsules, solutions, suspensions or emulsions.

The pharmaceutical compositions according to the present invention are administered in varying doses, depending upon the application intended, these doses being proportional to the seriousness of the calcium deficiency to be treated. In the most serious cases, for example cases of osteoporosis, the dose of calcium may be 2–3 g. per day for 3 weeks; ordinarily, for more benign cases, the dose administered is about 0.5 – 1 g. of calcium per day.

In the following Examples of pharmaceutical compositions according to the present invention, the active calcium compound according to the present invention is lysino-calcium chloride citrate (1/1).

EXAMPLE 7.

Injectable preparations.

a. In ampoules: content of active material: 5 to 10 mg. of calcium/ml.
solvent; distilled water
capacity of ampoules: 5–10 ml.
sterilization by autoclaving or sterile filtration.

b. Extemporaneous composition
Phial containing 25–100 mg. of calcium sterilized chemically, by dry heat, by irradiation or the like.
Ampoule of sterile distilled water, capacity 5–10 ml.

EXAMPLE 8.

Dosage unit sachets.

These are diluted in a glass of water at the time of use.

a. Non-effervescent compositions:

| active material | | 250 mg. of calcium |
|---|---|---|
| excipients: | sugar | q.s. ad 5 g. |
| | citric acid | 200 mg. |
| | polyvinylpyrrolidone | 15 mg. |
| | flavourings | 60 mg. |
| | edulcorants | 20 mg. |
| | colouring agents | 5 mg. | b. Effervescent compositions:

| active material | as in a) |
|---|---|
| excipients | as in a) |
| source of carbon dioxide | sodium bicarbonate or similar: 1.250 g. | c. Compositions containing ascorbic acid:

1 g. ascorbic acid is added to the non-effervescent and effervescent forms mentioned in a) and b) above.

EXAMPLE 9.

Effervescent tablets containing ascorbic acid.

| Active material | | 500 mg. of calcium<br>1 g. ascorbic acid |
|---|---|---|
| Excipients: | sugar | q.s. ad 10 g. |
| | lactose | 250 mg. |
| | citric acid | 200 mg. |
| | polyvinylpyrrolidone | 250 mg. |
| | sodium bicarbonate | 2.5 g. |
| | sodium benzoate | 25 mg. |
| | talc | 100 mg. |
| | colouring agents | 10 mg. |
| | edulcorants | 40 mg. |
| | flavourings | 120 mg. |

We claim:

1. A compound selected from the group consisting of lysino-calcium chloride of the formula

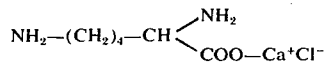

its laevorotatory form, its dextrorotatory form mixtures of these forms and pharmaceutically acceptable acid addition salts thereof.

2. A pharmaceutically acceptable acid addition salt of lysino-calcium chloride according to claim 1.

3. The salt according to claim 2, wherein the pharmaceutically acceptable acid is selected from the group consisting of hydrochloric, hydrobromic, sulfuric, phosphoric, carbonic, acetic, propionic, pivalic, glycolic, lactic, malonic, succinic, maleic, hydroxymaleic, malic, tartaric, citric, aminoacetic, gluconic, glutamic, benzoic, salicyclic, 2-acetoxybenzoic, nicotinic, isonicotinic, methane-sulfonic, ethane-sulfonic, ethane-1,2-disulfonic, 2-hydroxy-ethane-sulfonic and p-toluene-sulfonic acids.

4. The salt according to claim 2, namely L-lysino-calcium chloride citrate 1/1.

5. The salt according to claim 2, namely L-lysino-calcium chloride citrate 2/1.

6. The salt according to claim 2, namely L-lysino-calcium chloride diacetate.

7. The salt according to claim 2, namely L-lysino-calcium chloride monoacetate.

8. The salt according to claim 2, namely L-lysino-calcium chloride carbonate.

9. The salt according to claim 2, namely L-lysino-calcium chloride bicarbonate.

10. The salt according to claim 2, namely L-lysino-calcium chloride α-glycerophosphate.

11. The salt according to claim 2, namely L-lysino-calcium chloride glycinate.

12. The salt according to claim 2, namely L-lysino-calcium chloride gluconate.

13. The salt according to claim 2, namely L-lysino-calcium chloride L-glutamate.

14. The salt according to claim 2, namely L-lysino-calcium chloride hydrochloride.

15. The salt according to claim 2, namely L-lysino-calcium chloride monophosphate.

16. A process for the preparation of lysino-calcium chloride of the formula

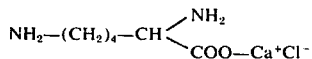

which comprises reacting lysine monohydrochloride in a reaction medium selected from water, anhydrous alcohol and aqueous alcohol, with a calcium compound selected from calcium hydroxide and calcium oxide in substantially equimolar amounts.

17. The process according to claim 16, wherein the lysino-calcium chloride obtained is recovered by evaporation to dryness in vacuo or lyophylization of the reaction solution.

18. The process according to claim 16, wherein said lysine monohydrochloride is leavorotatory.

19. The process according to claim 16, wherein said lysine monohydrochloride is dextrorotatory.

20. The process according to claim 16, wherein said lysine monohydrochloride is a mixture of its laevorotatory and dextrorotatory forms.

21. The process according to claim 16, wherein 1 mole of the calcium compound is used per mole of lysine monohydrochloride.

22. The process according to claim 16, wherein 1.01 to 1.20 moles of the calcium compound are used per mole of lysine monohydrochloride.

23. The process according to claim 16, wherein the alcohol is selected from saturated aliphatic alcohols having 1 to 5 carbon atoms and araliphatic alcohols having 7 to 10 carbon atoms.

24. The process according to claim 16, wherein the alcohol is selected from methanol, ethanol and benzyl alcohol.

* * * * *